US009674106B2

(12) United States Patent
Reeves et al.

(10) Patent No.: US 9,674,106 B2
(45) Date of Patent: Jun. 6, 2017

(54) METHODS AND APPARATUS FOR SECURE REMOTE CONNECTION

(71) Applicant: RealVNC Ltd, Cambridge, Cambridgeshire (GB)

(72) Inventors: Nicolas David Reeves, Cambridge (GB); Christopher Michael Goldsmith, Cambridge (GB); Antony Clive Mann, Cambridge (GB); Philip John Richards, Cambridge (GB); Thomas Henry Lynn, Cambridge (GB); Katarzyna Maria Czeczot, Cambridge (GB)

(73) Assignee: RealVNC Ltd, Cambridge (GB)

( * ) Notice: Subject to any disclaimer, the term of this patent is extended or adjusted under 35 U.S.C. 154(b) by 212 days.

(21) Appl. No.: 14/097,204

(22) Filed: Dec. 4, 2013

(65) Prior Publication Data
US 2014/0310414 A1    Oct. 16, 2014

(30) Foreign Application Priority Data
Apr. 10, 2013    (GB) .................................. 1306509.9

(51) Int. Cl.
*H04L 12/911*    (2013.01)
*H04L 29/06*    (2006.01)
(Continued)

(52) U.S. Cl.
CPC ............ *H04L 47/70* (2013.01); *G06F 3/1454* (2013.01); *H04L 63/0838* (2013.01);
(Continued)

(58) Field of Classification Search
CPC . H04L 63/08; H04L 63/0884; H04L 63/0838; H04L 47/70; H04L 63/0846;
(Continued)

(56) References Cited

U.S. PATENT DOCUMENTS 7,257,837 B2    8/2007 Xu et al.
8,347,365 B2 *  1/2013 Jelatis et al. ...................... 726/5
(Continued)

FOREIGN PATENT DOCUMENTS

EP    1998506    12/2008
EP    2605471    6/2013

OTHER PUBLICATIONS

International Application No. PCT/GB2014/050095, International Search Report and Written Opinion mailed Jul. 23, 2014.
(Continued)

*Primary Examiner* — Vivek Srivastava
*Assistant Examiner* — William C McBeth
(74) *Attorney, Agent, or Firm* — Sheppard, Mullin, Richter & Hampton LLP

(57) ABSTRACT

A method and system for establishing a helpdesk session between a subscriber device and a customer support representative (CSR) device following a request for a helpdesk session. The system issuing, on receipt of said request, a credential pair comprising subscriber credentials for a subscriber device and CSR credentials for a CSR device which is paired with the subscriber device. The subscriber credentials are transferred to the subscriber device and the CSR credentials are transferred to the CSR device. The subscriber and CSR credentials are then transferred to a core node for authentication. If the credentials are authentic the helpdesk session between the paired subscriber device and the CSR device is established.

16 Claims, 8 Drawing Sheets

(51) Int. Cl.
*G06F 3/14* (2006.01)
*H04L 29/08* (2006.01)

(52) U.S. Cl.
CPC ........ *H04L 63/0884* (2013.01); *H04L 67/141* (2013.01); *G09G 2360/121* (2013.01); *G09G 2370/022* (2013.01); *H04L 63/0869* (2013.01)

(58) Field of Classification Search
CPC .. H04L 63/0869; H04L 67/141; H04W 12/06; H04W 12/08; G06F 21/31; G06F 21/305; G06F 3/1454
See application file for complete search history.

(56) References Cited

U.S. PATENT DOCUMENTS

| | | | | |
|---|---|---|---|---|
| 8,732,805 | B2* | 5/2014 | Kavantzas et al. | 726/5 |
| 8,935,706 | B2* | 1/2015 | Ellis et al. | 719/310 |
| 8,972,507 | B1* | 3/2015 | Hendren | H04L 67/141 |
| | | | | 455/466 |
| 9,008,316 | B2* | 4/2015 | Acar et al. | 380/278 |
| 9,009,797 | B1* | 4/2015 | Fox | 726/6 |
| 9,032,488 | B2* | 5/2015 | Lee | 726/4 |
| 2009/0100349 | A1* | 4/2009 | Hancock | H04L 63/0435 |
| | | | | 715/751 |
| 2009/0235342 | A1* | 9/2009 | Manion et al. | 726/7 |
| 2009/0300741 | A1* | 12/2009 | Greenwood | H04L 63/0838 |
| | | | | 726/6 |
| 2009/0307600 | A1* | 12/2009 | Arthur | G06F 11/3664 |
| | | | | 715/740 |
| 2011/0023096 | A1 | 1/2011 | Xiao et al. | |
| 2011/0137809 | A1 | 6/2011 | Klapheke | |
| 2011/0252146 | A1* | 10/2011 | Santamaria | H04M 7/0057 |
| | | | | 709/227 |
| 2011/0252238 | A1* | 10/2011 | Abuan | H04L 67/141 |
| | | | | 713/168 |
| 2013/0091214 | A1 | 4/2013 | Kellerman et al. | |
| 2013/0138822 | A1* | 5/2013 | Hu et al. | 709/227 |
| 2014/0223525 | A1* | 8/2014 | Fadida | H04L 63/083 |
| | | | | 726/6 |
| 2014/0289830 | A1* | 9/2014 | Lemaster | H04L 63/08 |
| | | | | 726/7 |

OTHER PUBLICATIONS

Great Britain Application No. GB1306509.9, Search Report mailed Oct. 16, 2013.
Great Britain Application No. GB1306509.9, Second Examination Report mailed Nov. 14, 2014.
Great Britain Application No. GB1306509.9, Examination Report mailed Dec. 13, 2013.
International Application No. PCT/GB2014/050095, Invitation to Pay Additional Fees and Partial International Search Report mailed Apr. 14, 2014.
Great Britain Application No. GB1306510.7, Letter re Examination mailed Dec. 13, 2013.
Great Britain Application No. GB1306510.7, Search Report mailed Oct. 16, 2013.
International Application No. PCT/GB2014/050094, International Search Report and Written Opinion mailed Apr. 17, 2014.

* cited by examiner

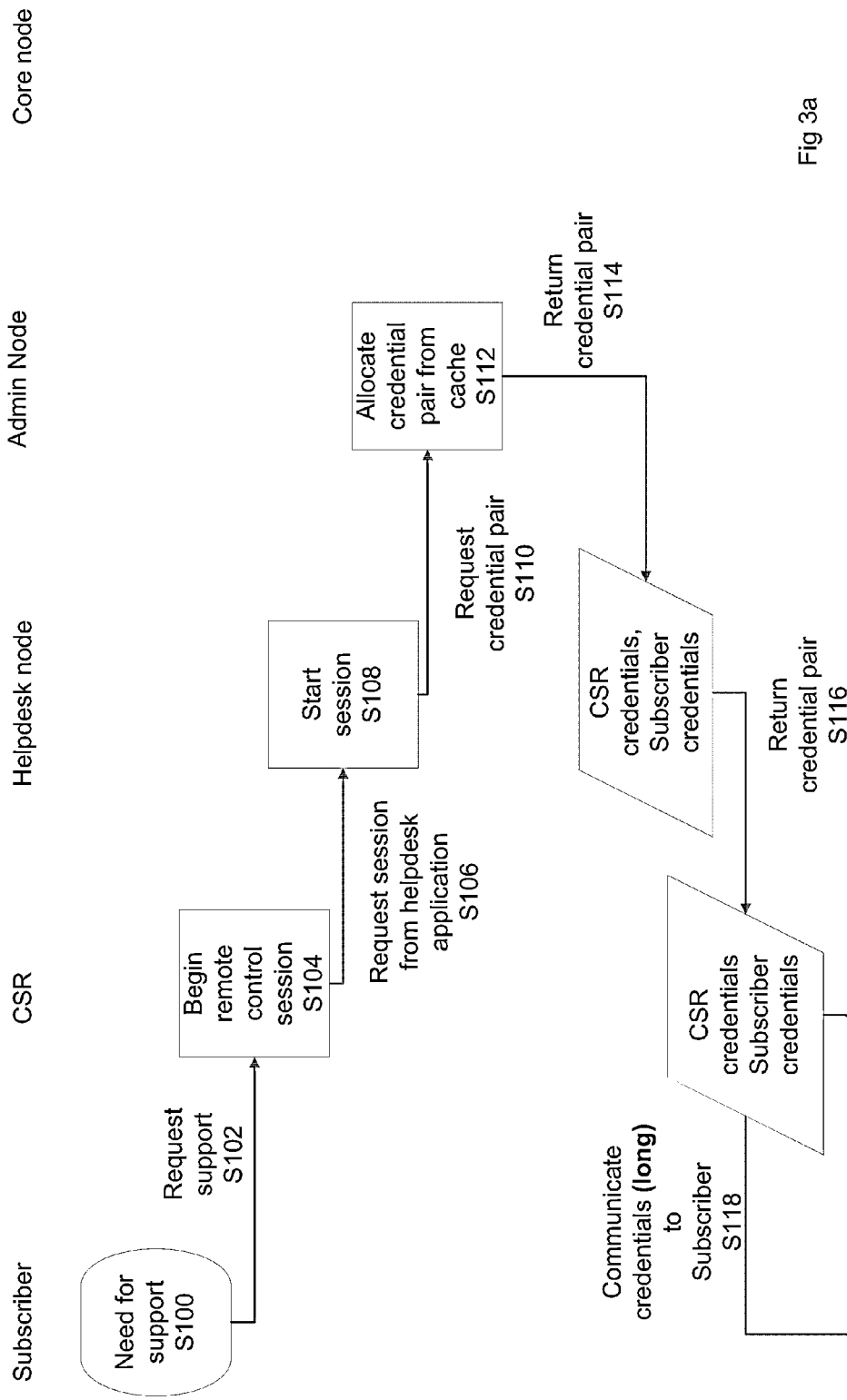

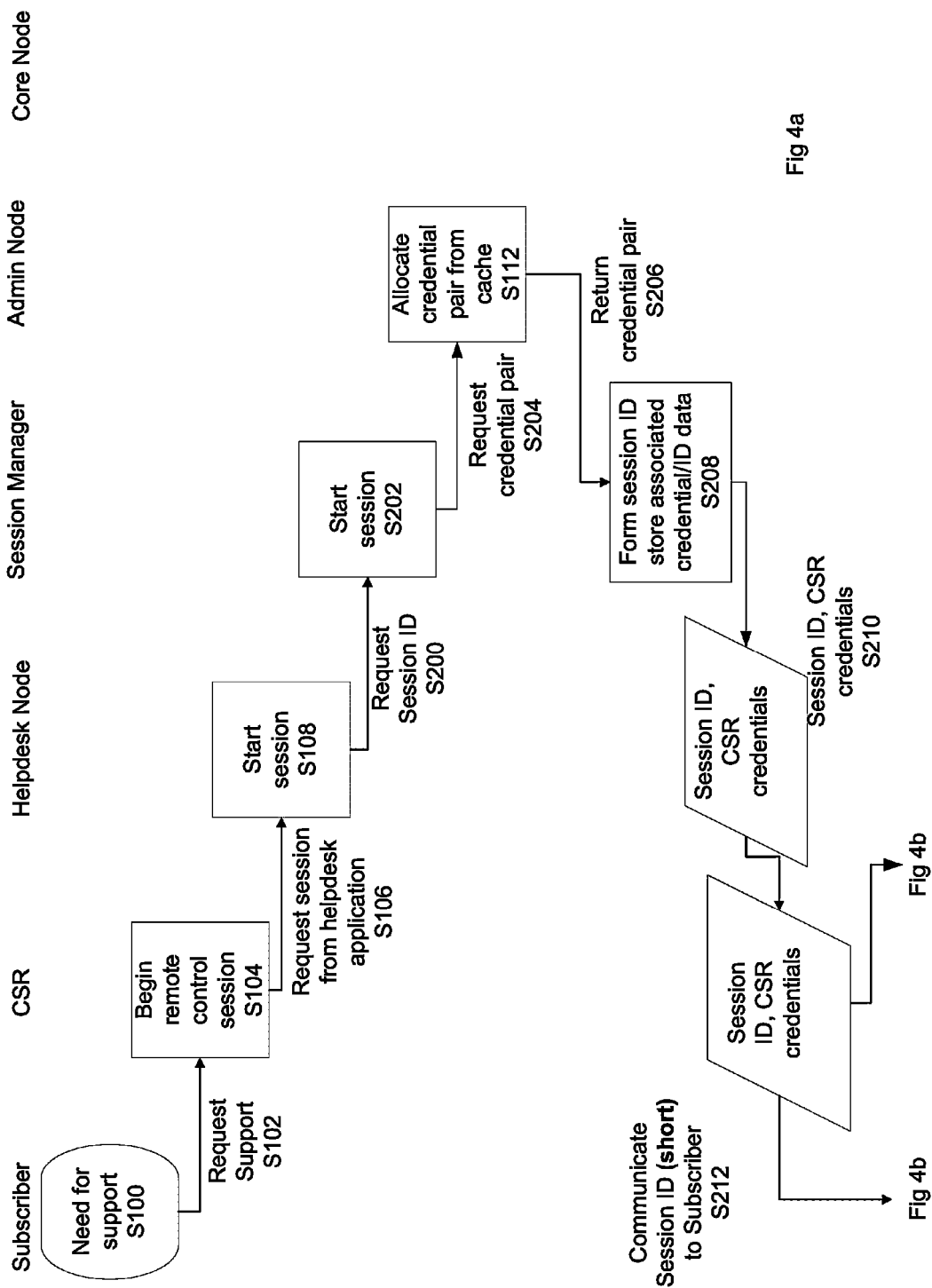

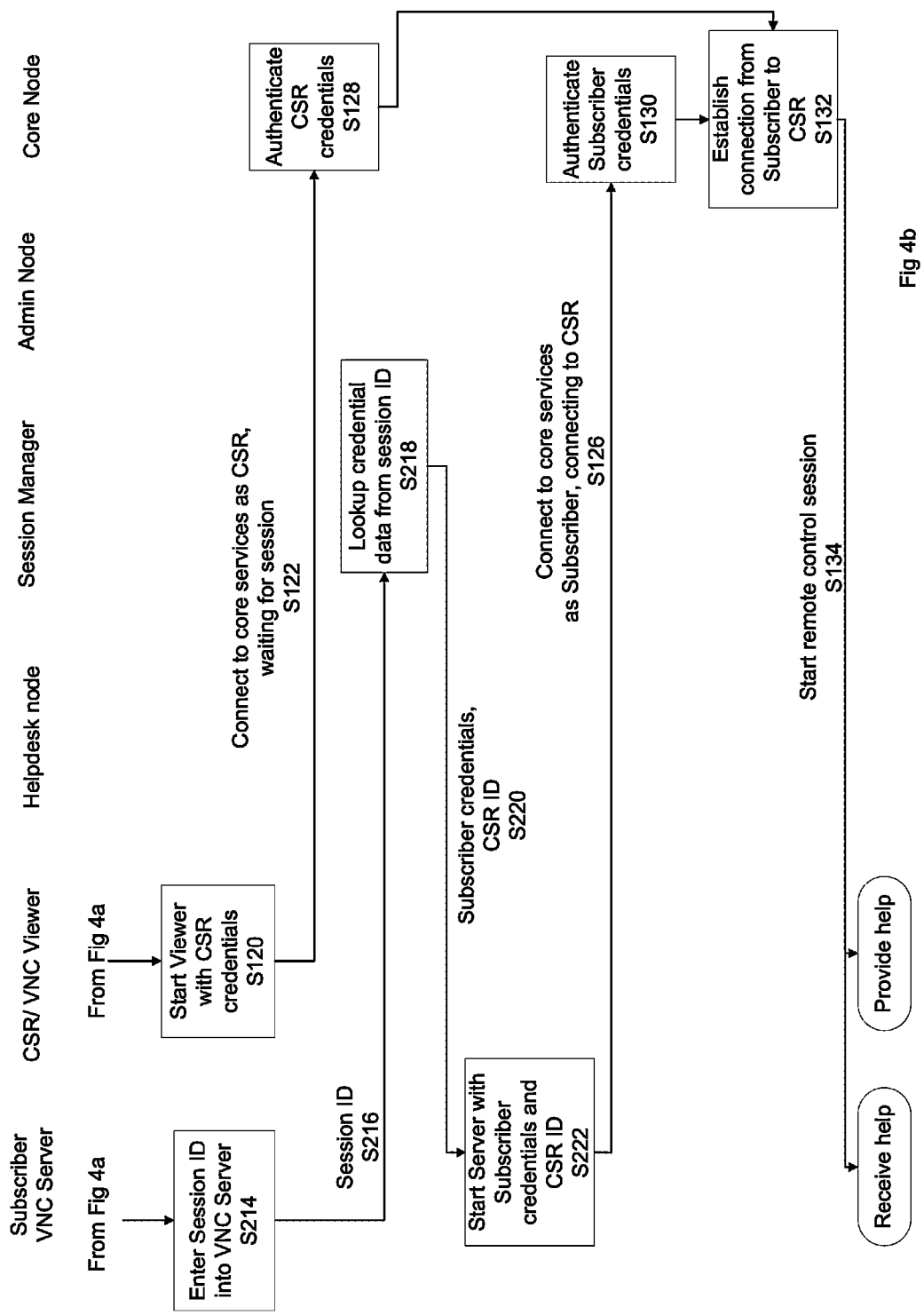

METHODS AND APPARATUS FOR SECURE REMOTE CONNECTION

CROSS-REFERENCE TO RELATED APPLICATIONS

This application claims the benefit of United Kingdom Patent Application No. GB1306509.9, filed on Apr. 10, 2013 and entitled "Methods and Apparatus for Remote Connection," which is hereby incorporated by reference herein.

FIELD OF THE INVENTION

The present invention relates to a method and system for remote controlling and/or viewing a computing device.

BACKGROUND

It is known to use a first computer device to view and control a second computer device using a Virtual Network Computing (VNC) viewer application running on the first computer device (VNC viewer) and a VNC server application running on the second computer device (VNC server). The contents of the display of the second computer device are duplicated on the first computer device which is typically remote from the second computer device. The first computer device has an interface mechanism which allows the user to send user input events, such as pressing a physical key on the device, moving the mouse cursor or touching a touch screen input, to the second computer device being controlled. As will be appreciated, the form of data link and the nature of the computer devices can vary, depending on the situation being used.

It is also known for a subscriber who is experiencing a problem with their computer device to contact a customer support representative (CSR) for help. However, in many scenarios, the subscriber typically does not have any remote assistance software on their computer, so is 'unknown' to the CSR's systems. The contact with the CSR is made by other methods, e.g. phoning a helpline, engaging in text chat, etc.

The present system and method provide a helpdesk which enables a customer support representative (CSR) on a first computer device to use the remote control facility to provide device support to a subscriber who is using a second computer device. The applicant has recognised the need for a helpdesk which is secure, efficient to host and easy for the CSR and subscriber to use.

SUMMARY OF THE INVENTION

According to a first aspect of the invention, there is provided a system for establishing a helpdesk session between a subscriber device and a customer support representative (CSR) device, the system comprising:
  a helpdesk node which is configured to
    receive a request for a helpdesk session;
  an admin node which is configured to
    issue a credential pair comprising subscriber credentials for a subscriber device and CSR credentials for a CSR device which is paired with the subscriber device; and
  a core node which is configured to
    receive the CSR credentials for the CSR device,
    receive the subscriber credentials for the subscriber device which is paired with the CSR device,
    authenticate the received credentials, and
    if said credentials are authentic, establish the helpdesk session between the paired subscriber device and the CSR device.

According to a second aspect of the invention, there is provided a method for establishing a helpdesk session between a subscriber device and a customer support representative (CSR) device, the method comprising:
  receiving a request for a helpdesk session;
  issuing, on receipt of said request, a credential pair comprising subscriber credentials for a subscriber device and CSR credentials for a CSR device which is paired with the subscriber device;
  transferring said subscriber credentials to said subscriber device;
  transferring said CSR credentials to said CSR device;
  receiving the CSR credentials from the CSR device,
  receiving the subscriber credentials for the subscriber device which is paired with the CSR device,
  authenticating the received credentials, and
  if said credentials are authentic, establishing the helpdesk session between the paired subscriber device and the CSR device.

The request may be received at a helpdesk node. The credential pair may be issued by an admin node. The CSR and subscriber credentials may be received at a core node. The helpdesk node, admin node and/or core node are preferably separate devices to help maintain the integrity of the system. However, one or more node may be combined in a single device if required.

The following features apply to both aspects of the invention.

The helpdesk node may be configured to request the credential pair from the admin node and the admin node may be configured to return the credential pair to the helpdesk node. The helpdesk node may then transfer the credential pair to a device which requested the helpdesk session. For example, the helpdesk node may be configured to receive a request for a helpdesk session from the CSR device and to send the credential pair to the CSR device. The subscriber credentials in the credential pair may then be transferred from the CSR device to the subscriber device. Thus in this case, the subscriber credentials are transferred to the subscriber device via the helpdesk node and the CSR device. It will be appreciated that the subscriber device may also request the helpdesk session (although this is less likely). In such a case, the CSR credentials are transferred to the CSR device via the helpdesk node and the subscriber device.

As an alternative to transferring the subscriber and/or CSR credentials direct from the helpdesk node, the system may further comprise a session manager as part of the transfer mechanism. Such an additional component may further increase the security of transfer of the credentials through the system.

The session manager may be configured to create a session ID for the helpdesk session. The helpdesk node may be configured to request a session ID from the session manager. The session manager may be configured to request the credential pair from the admin node and the admin node may be configured to return the credential pair to the session manager. The session manager may be configured to send the session ID and the credentials for the CSR device to the CSR device. The transfer may be direct or may be indirect, e.g. via the helpdesk node. The CSR device may then transfer the session ID to the subscriber.

The session manager may be configured to create the session ID using at least part of the subscriber credentials, for example using a one-way function. A one-way function is a function that is easy to compute on an input value to give a result but it is hard to determine an inverse function to apply to the result to obtain the original input. In this way, the subscriber credentials are preferably contained within the session ID so that the subscriber credentials may be obtained from the session ID but in such a manner that they are not easily obtained by a third party attacker, e.g. they may be encrypted. Thus, in contrast to the previous arrangement, the subscriber credentials themselves are not transmitted from the admin node. This provides additional security.

Thus according to another aspect of the invention, there is provided a session node for creating a session ID for a session connecting a subscriber machine with a CSR machine, the session node being configured to:
receive subscriber credentials;
perform a one-way function on least one part of said subscriber credentials to generate a result; and
create said session ID from said result of said performing step.

The subscriber credentials may comprise a subscriber identification and a subscriber authentication. The session manager may be configured to create the session ID using a one-way function in the form of at least one hash. The hash may be applied to one or both of the subscriber identification and the subscriber authentication. More than one hash may be applied and the keys may be the same or different. For example, the session manager may be configured to create the session ID by creating a validity hash. The session manager may be configured to create the session ID by creating a checksum. It will be appreciated that hashes and checksum are just one way of encrypting the data.

The session ID may be sequence of characters which is easily entered by a user, e.g. a short sequence of digits and letters, and which is easily transmitted, e.g. by communicating over the phone as well as by digital means. The session manager may thus reduce the length of the session ID created using one or more one-way functions, e.g. by applying a reduced size checksum.

It will be appreciated that the subscriber device may also request the helpdesk session (although this is less likely). In such a case, the session ID may be based on the CSR credentials which may comprise a CSR identification and a CSR authentication. The session manager may be configured to send the session ID and the credentials for the subscriber device to the subscriber device. The session ID may be transferred to the CSR device via the helpdesk node and the subscriber device.

Once the session ID is received by the subscriber device (or CSR device), it may be entered into the appropriate application and the session ID may be sent to the session manager. The session manager may be configured to determine the credentials for the subscriber device (or CSR device) from the received session ID and to send the credentials for the subscriber device (or CSR device) to the subscriber device. The subscriber device may then perform a validation check based on the original session ID to confirm that they have received the expected subscriber credentials.

The admin node may be configured to create a plurality of pre-paired subscriber and CSR credentials before issuing the credential pair. There may be a plurality of subscriber devices and a plurality of CSR devices, each having their own credentials. The pre-paired credentials may be created by associating each subscriber device in a plurality of subscriber devices with an associated CSR device and pairing the subscriber credentials and the CSR credentials for the associated pair of devices.

Thus according to another aspect of the invention, there is provided an admin node for issuing pairs of subscriber and CSR credentials, the admin node comprising
a database comprising a plurality of credentials for subscriber devices and a plurality of credentials for CSR devices;
a processor which is configured to
associate one of said plurality of subscriber devices with one of said plurality of CSR devices to form an associated pair of subscriber and CSR devices;
pair the subscriber credentials and the CSR credentials for the associated pair of devices;
repeat said associating and pairing step to create a plurality of pre-paired subscriber and CSR credentials; and
issue a credential pair on request.

The database may be divided into a pool of subscriber devices and a pool of CSR devices. The associating step may comprise selecting a subscriber device and the pairing step may comprise writing at least part, e.g. ID, from the CSR credentials of a CSR device into the subscriber credentials for the selected subscriber device. Alternatively, the associating step may comprise selecting a CSR device and the pairing step may comprise writing at least part, e.g. ID, from the subscriber credentials of a subscriber device into the CSR credentials for the selected CSR device. Another method is to associate a subscriber device with a CSR device by allocating said subscriber device a set of subscriber credential which contains an identification for a particular CSR device so that pairing comprises determining the CSR device from the subscriber credential. Alternatively, a subscriber device may be associated with a CSR device by allocating said CSR device a set of CSR credential which contains an identification for a particular subscriber device so that pairing comprises determining the associated subscriber device from the CSR credentials.

The admin node may be configured to reserve a batch of credential pairs (e.g. 100) and store the reserved batch in a local cache on said admin node. The admin node may be configured to send notification that a batch has been reserved to the core node. The core node may comprise a local cache which replicates the batch stored on the admin node. The admin node may be configured to associate said reserved batch with a fixed time period. The admin node may be configured to determine if said fixed time period has elapsed and if so, to discard the reserved batch. A notification of the discard may be transmitted to the core node.

The subscriber and CSR devices may be any computing terminal, for example desktops, PCs, servers as well as portable devices such as mobile phones, PDAs, laptops, tablets and similar devices. The devices are typically remote from one another. By remote, it is meant that the two devices are physically remote from each other. The devices may be located a considerable distance away from each other or may be located close by (e.g. both within an office). However, it is also possible for one or both of the devices to be a virtual machine in which case the devices to be running are on the same physical machine. The subscriber device may be termed a VNC server since it is sending information to be viewed on the CSR device. The CSR device may be termed a VNC viewer. These terms are used interchangeably throughout the description.

Any of the modules (e.g. helpdesk node, admin node, core node), databases or devices may be implemented in hardware for example as a general purpose computer modified (e.g. programmed or configured) by software to be a special-purpose computer to perform the functions described herein. The processors may be programmable processors, e.g. microprocessors.

The invention further provides processor control code to implement the above-described systems and methods, for example on a general purpose computer system or on a digital signal processor (DSP). The code may be provided on a carrier such as a disk, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

BRIEF DESCRIPTION OF THE DRAWINGS

The invention is diagrammatically illustrated, by way of example, in the accompanying drawings, in which:

FIGS. 3a and 3b are a flow chart showing the interaction of the components of FIG. 1 in establishing a helpdesk session;

FIGS. 4a and 4b are a flow chart show an alternative method for establishing a helpdesk session;

DETAILED DESCRIPTION OF THE DRAWINGS

Figure 1:
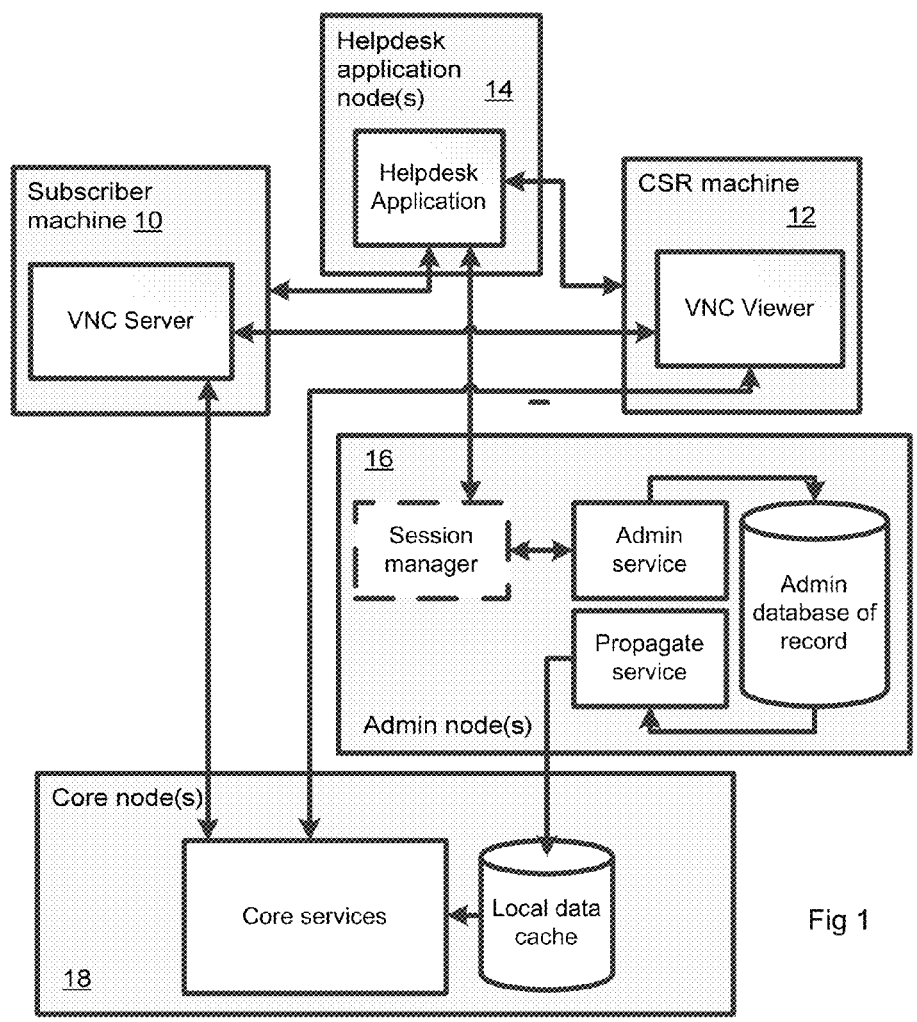
FIG. 1 is a block diagram showing the components of the system.

FIG. 1 shows the components of a helpdesk system enabling a customer support representative (CSR) to assist a subscriber who is having a problem with their computer. A subscriber machine 10 which supports a Virtual Network Computing (VNC) server application may be connected directly or indirectly to a customer support representative (CSR) machine 12 which supports a VNC viewer application. The indirect connection may be via a helpdesk application node 14 having a helpdesk application and/or via one or more core node(s) 18. The core node(s) house core services and a local data cache. An admin node 16 which comprises a session manager application, an admin service, a propagate service and an admin database may be connected to the helpdesk application to facilitate the connection. The various connections are explained in more detail below.

Thus, as shown in FIG. 1, the helpdesk system is built on top of the VNC Hosted Services which comprise a set of core services and a set of admin services. The core services typically use industry standard approaches to allow two entities to find and connect to each other, traversing NAT and firewalls as appropriate to find the best means of connection. They are designed to provide an application-independent connection. The admin services provide an application programming interface (API) to allow applications to administer the system, including creating the principal credentials used to authenticate a Principal to the system, and control the rights that Principal has within the system.

Principal is a standard computer security term that means an entity that can be identified and authenticated. For example, in the present invention, a Principal may be a user (e.g. individual CSRs and subscribers), a machine (e.g. a computer), a node, a computational entity such as a process or any group of such things.

For user Principals, identification may be achieved by use of a user name. For machines, identification may be done by means of a machine identifier. Other entities may be identified in the normal ways familiar to one skilled in the art. The information used to identify Principals of any type is known as the ID.

Principals can be authenticated by a range of methods. Of most interest in the present invention are the password and certificate methods. Typically, user Principals are authenticated by use of a password, and machine and process Principals are authenticated by use of a public key. The skilled person would recognize that other authentication mechanisms may also be used, e.g. certificates may be used to both identify and authenticate a Principal. A Principal's ID may form part of a Principal's credentials.

The combination of information used to identify and authenticate a Principal of any type is known as the credentials. The credentials for a Principal in the hosted services are stored in a principal record. The principal record is thus an entry in a data store which can be used to check that credentials allocated to a Principal are authentic. The principal record can also be used to store other data associated with that Principal such as who it is allowed to connect with.

The constituent services of VNC Hosted Services may be deployed onto nodes in a variety of ways, to meet different requirements on redundancy, capacity, and simplicity. In the simplest case, all admin and core services are run on a single node (i.e. on a single machine). This offers no redundancy in the event of failure, and a relatively small capacity as everything must run on one node. However, such a deployment is simple to set up and maintain, and may typically be used for evaluation.

In another case, the admin services run on one node, and the core services run over several separate nodes (i.e. over several separate machines). This configuration provides for a higher capacity, as the core services are the limiting factor when considering overall system capacity. This configuration also provides for redundancy in the core services, should one of the core service nodes fail. It does not provide for redundancy of the admin services, however. This type of deployment is more complex than the single node system, but not as complex to set up and maintain as some of the more elaborate deployments.

In another case, there are multiple admin nodes and multiple core nodes, bringing the associated benefits in capacity and redundancy, but at the cost of simplicity.

In any of the above cases, the nodes may be distributed across a geographically wide area to provide better quality of service in different regions. The core services and admin services are themselves comprised of named sub-services: The core services comprise bootstrap, discovery, rendezvous, connection broker and relay sub-services. The admin services comprise admin and propagate sub-services. These sub-services can themselves be deployed onto nodes in any combination as is required to meet reliability and capacity goals. For example a node may run only a single service (e.g. relay) or a node may run a mix of sub-services (e.g. propagate, bootstrap, and discovery).

Furthermore, as shown in FIG. 1, a database is required. To meet the capacity and performance requirements of the system, a solution with a single central database of record is unlikely to be sufficient as it would introduce a performance bottleneck. Additionally, a central database is the hardest to scale because it is stateful and the constraints and additional indexes of the complex relational model need to be maintained across the whole system. As such, scaling such a database is typically done by increasing the performance of the hardware it runs on. To reach the capacities typically needed in helpdesk applications, the cost of the database hardware would dominate the cost of the other nodes, making it inefficient to host such a system.

The data model of the hosted services has been designed to recognize that not all data needs to be stored in a powerful system of record. The more complex data which does need to be stored centrally can be reduced to a size which makes it practical to host, and other, simpler data can be stored in a more scalable way. The VNC Hosted Services has been designed so that the Admin services favour consistency and complex data model, whilst the core services favour availability and simple, efficient, easily scalable data model. This is because the Admin operations are expected to need to make consistent changes to a system of record, potentially need a richer data model to decide what to do, and occur far less often, whilst the core services need to be able to do a much larger number of simple things reliably.

Figure 2B:
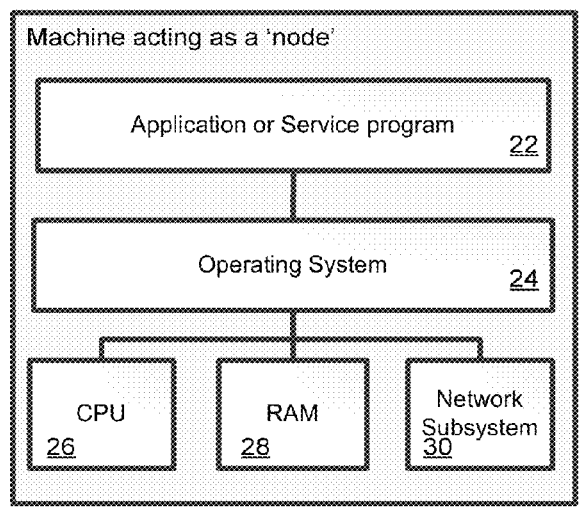
FIG. 2b is a block diagram showing the components of a node from FIG. 1.
Figure 2A:
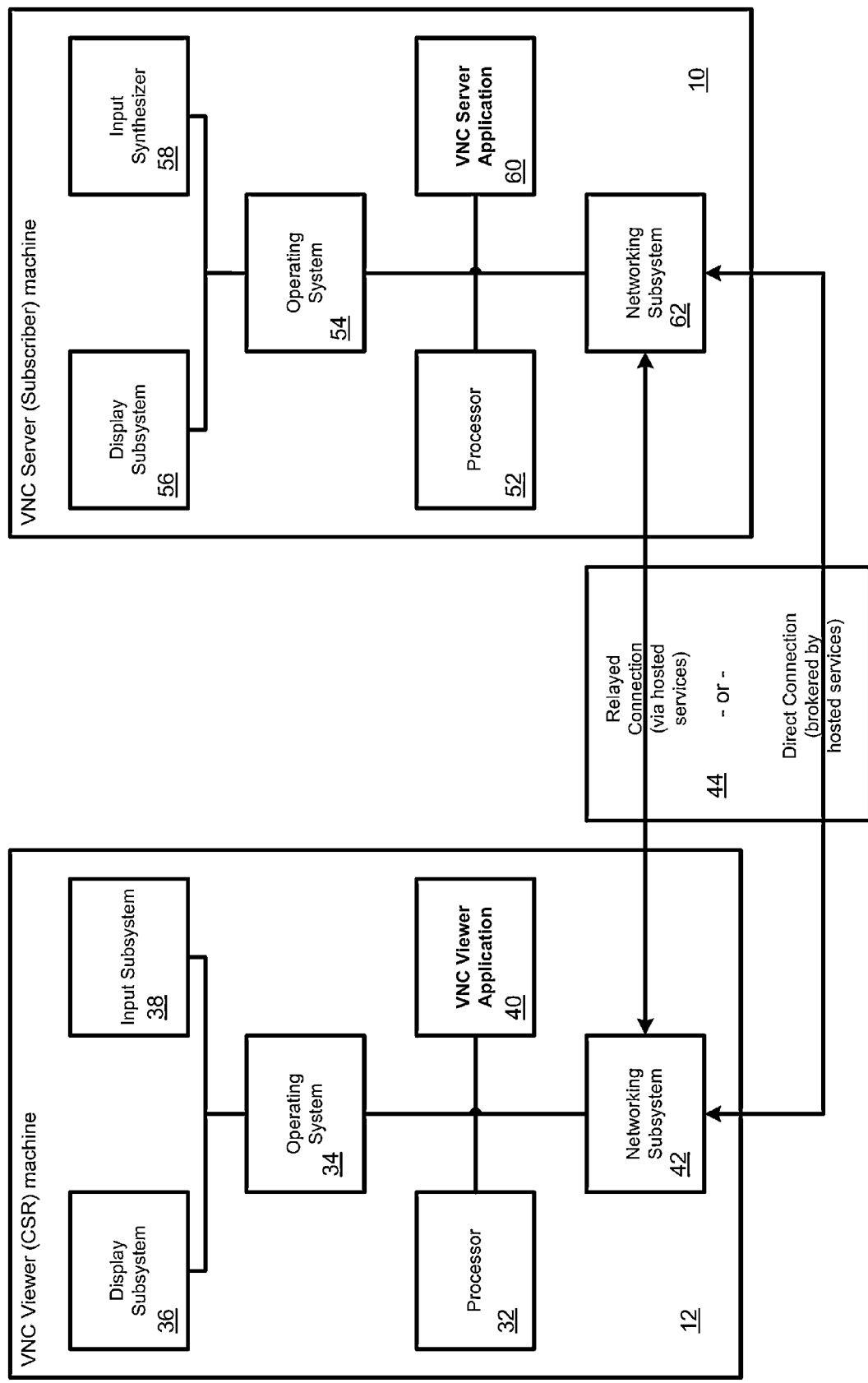
FIG. 2a is a block diagram showing the components of the subscriber machine and customer support representative machine from FIG. 1.

FIG. 2a shows the various components of the subscriber machine 10 (remote device) which is connected via a connection 44 to the customer support representative machine 12 (local device). The connection 44 may be a relayed connection via a hosted service or a direct connection which is brokered by the hosted service. The connection 44 is described in more detail below.

The CSR machine 12 comprises a processor 32, an operating system 34, an input subsystem 38, a display subsystem 36 and a networking subsystem 24 connected to the connection 44. The subscriber machine 10 comprises a processor 52, an input synthesiser 58, a display subsystem 56 and a networking subsystem 52 connected to the connection. A VNC server application 60 is running on the remote device to capture an image of the display subsystem 56 and send it via the connection to the local device; thus the remote device may be termed a VNC server. A corresponding VNC viewer application 40 is running on the local device processor 32 to receive the image of the display via the networking subsystem 42 and output it on the local display subsystem 36; thus the local device may be termed a VNC viewer.

The remote device comprises an input synthesiser 58 to input instructions from a client, e.g. cursor (pointer) movements or other inputs. Thus, cursor movements on the local device can trigger cursor movements on the display of the remote device. The input synthesiser 58 together with the VNC server application of the remote device translate such cursor movements into events on the remote device.

FIG. 2b shows the various components of any one of the nodes (i.e. the helpdesk application node, the core node(s) or the admin node). These components are merely illustrative of the typical components of such devices. It will be appreciated that the components may be housed together or separately. The application or service program 22 may be run on the operating system 24 which is connected to a central processing unit CPU 26, a RAM 28 and a network subsystem 30.

Figure 3B:
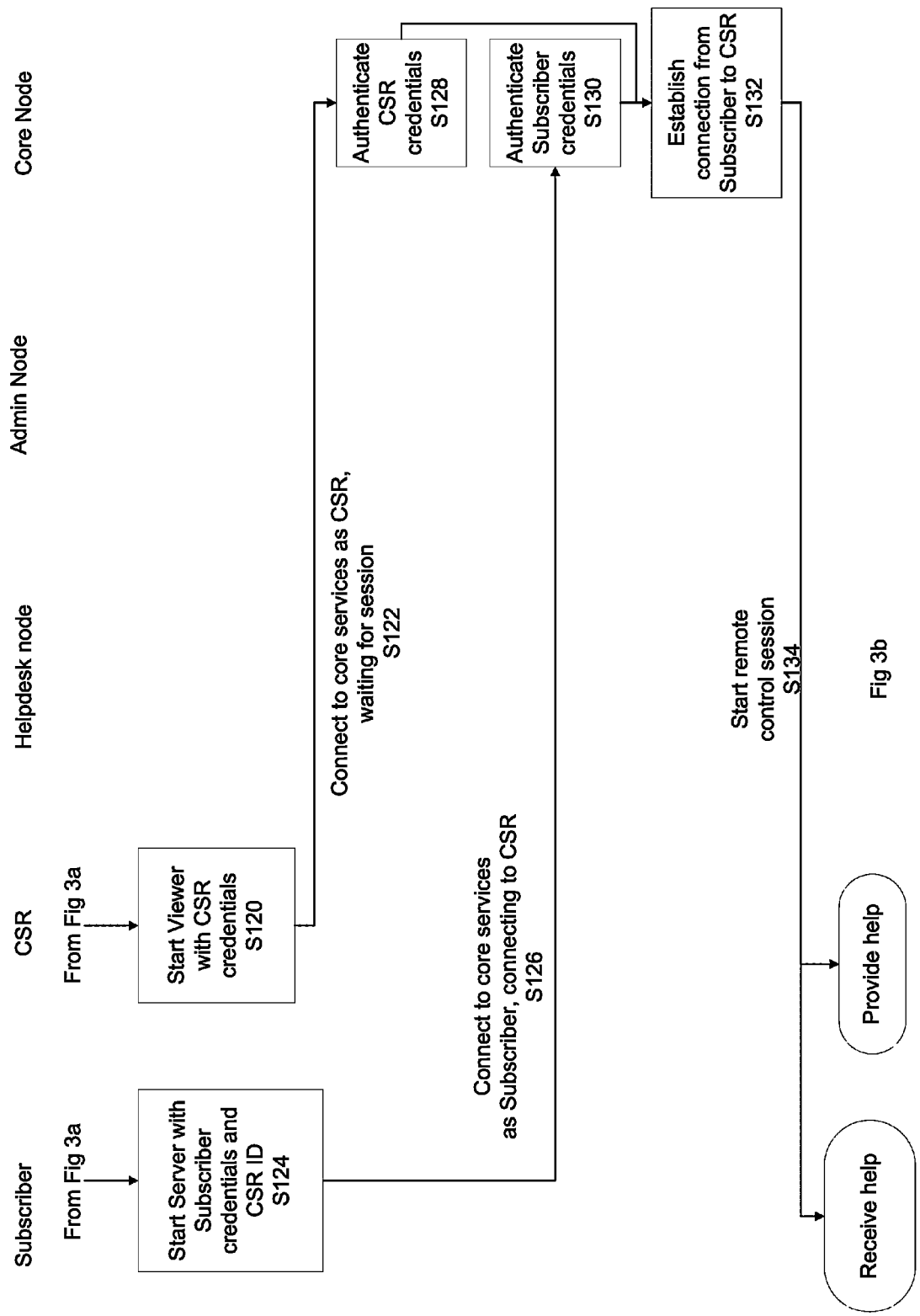

FIGS. 3a to 4b show two alternative methods for establishing a connection between the subscriber machine and a CSR machine. In FIGS. 3a and 3b, a simplified method for establishing a helpdesk session is described. In FIGS. 4a and 4b, a session manager is used to facilitate the establishment of a helpdesk session. Before describing these methods in detail, it is helpful to understand a naïve approach to how the subscriber machine and the CSR machine may be connected.

One naïve approach to establishing a connection between a CSR and a subscriber they've never contacted before has the following steps:
1. CSR has a VNC Viewer, and either has existing credentials, or requests new ones. They use them to connect and authenticate themselves to the hosted services.
2. CSR requests new credentials to give to the subscriber.
3. CSR communicates subscriber credentials to the subscriber. CSR initiates connection, and waits for subscriber to accept it.
4. Subscriber downloads a VNC Server from the CSR's organization that knows how to find the hosted services instance.
5. Subscriber types provided subscriber credentials into their VNC Server, which connects and uses them to authenticate with the hosted services and accept the waiting connection from the CSR.
6. Sometime after the helpdesk session, temporary subscriber credentials are removed.

The main drawback if the CSR initiates the connection is that if the subscriber credentials are intercepted, an attacker can spoof the CSR and connect into the VNC Server on the subscriber's machine, and take control of the user's machine.

FIGS. 3a and 3b show the following steps in the method of one embodiment of the present invention. The first step is that the subscriber needs support (S100) and thus a request for support is sent from the subscriber machine to the CSR machine (S102). The CSR machine initiates the remote control session (S104) and sends a request for a session from the helpdesk application to the helpdesk node (S106) which is running the helpdesk application. The helpdesk node starts a session (S108) and requests a pair of credentials from the admin node (S110), in particular from the admin service application running on the admin node.

The admin node sends out the credentials pair (S114) to the helpdesk node which then returns the credentials pair to the CSR (S116). The CSR sends the relevant credential details to the subscriber (S118) and initiates the Viewer application using the CSR credentials that it has just received (S120). Initiating the Viewer application may include downloading the VNC server from the CSR's organisation that knows how to find the hosted services. If this is the case, a subscriber must take the normal precautions to verify that the VNC server is legitimate (e.g. downloaded from a verified source, OS confirms any digital signature is intact when the server is launched, etc.).

Once the CSR has forwarded on the credential details, the CSR machine then connects to the core node as a CSR to access the core services and waits for a session to be initiated by a subscriber (S122). On receipt of the principal details, the subscriber initiates the Server application using the subscriber credentials and the CSR ID (S124). The subscriber machine then connects to the core node as a subscriber to access the core services and to connect to the CSR machine (S126), as identified by the CSR ID.

At the core node, the core services application responds to the requests for connection from the CSR machine and the subscriber machine by authenticating the CSR credentials (S128) received from the CSR machine and by authenticating the subscriber credentials (S130) received from the subscriber machine. If the authentication is correct, the code node establishes a connection from the subscriber machine to the CSR machine, identified by the CSR ID (S132). The subscriber machine and the CSR machine can thus start a remote control session (S134) so that the CSR can provide help which is received by the subscriber.

The key differences over the naïve sequence are thus:
a) The CSR communicates CSR ID and subscriber credentials to the subscriber as in the naïve sequence but then the CSR waits to accept a connection from the subscriber.
b) The subscriber initiates a connection to the waiting CSR, by entering data into the VNC server.
c) The CSR is always given its own principal credentials.
d) The credentials of a CSR are paired with credential of a subscriber at the admin node and the credential pair is sent out.

Features (a) and (b) combine to form one way to avoid the interception which was identified as a problem in the known approach. Using this approach, if an attacker were to intercept the subscriber credentials now, all they would be able to do would be to impersonate a subscriber, and get some free help from a CSR. The potential for damage is thus reduced if these optional features are included although it will be appreciated that the system can be implemented in a different manner.

Feature (d) is important because this controls connections so that a subscriber can only connect to the paired CSR. This feature can be implemented without the other key features identified above.

In the method described in FIGS. 3a and 3b, the credentials are supplied to the helpdesk node by the admin node from its cache but are authenticated by a core node. The principal records are preferably created using the admin service. If all core nodes continually have to check a single system of record to see if provided credentials are valid, this introduces a bottleneck and a single point of failure. Accordingly, changes are propagated out to the relevant core nodes when a change is made to a principal record with the admin service. Such changes take time to propagate outwards and this may cause a difficulty because often the new principal record may be needed very shortly after it is created.

Figure 5:
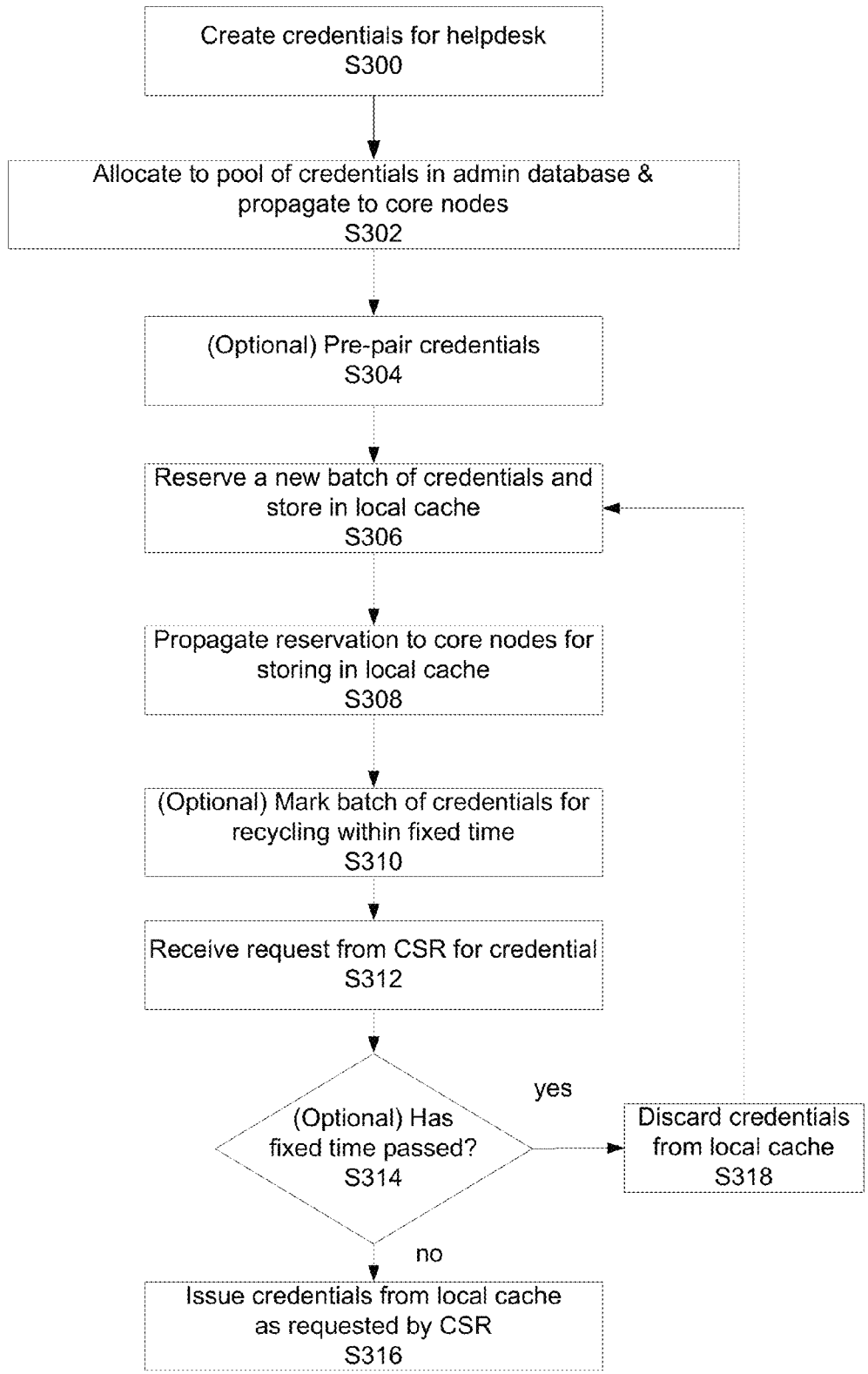
FIG. 5 is a flowchart showing the steps of creating credential data at the admin node.

FIG. 5 sets out the steps at the admin node which provide an efficient architecture without an expensive central database. A key feature is that the credentials and their associated records are created (S300) and then assigned to a pool of principals for use by helpdesk in advance (S302). These credentials then have plenty of time to propagate to the relevant nodes before they are needed, and can be supplied to the helpdesk node immediately when they are needed.

An optional enhancement is set out at step S304 in which the credentials are pre-paired. One method for pre-pairing the credentials is to assign the subscriber credentials to one pool and the CSR credentials to another pool. The credentials may then be paired when they are issued/associated with Principals by taking a principal record from one pool and writing the ID of a principal record from the other pool into the first selected principal record. However, such a method requires an expensive write each time pairing occurs.

An alternative method is to pair the credentials based on the number of their ID to further avoid writes that associate Subscriber and CSR Principals. IDs may thus have a prefix-number-suffix form, where the prefix and/or suffix identifies whether the associated Principal is a subscriber-side or CSR-side Principal. Thus if you already know the Subscriber ID, this form makes it possible to discover the CSR ID to connect to. In other words, one Principal is simply allocated credentials from a pool and the ID of the related Principal can be inferred from an index (although CSR authentication information is still recycled as explained below). This guarantees they will always be used in consistent pairs, and so has the effect of allowing the relevant access control to be enabled as well. The access control only allows principals to communicate via the hosted services only with their paired counterpart. This guards against potential spoofing attacks.

Another enhancement is set out at steps S306 to S318. The admin service reserves a batch of credentials (e.g. 100 pre-paired credentials) from the hosted services pool in advance, and places them in a local cache to issue/assign to Principals on demand. The batch of credentials are allocated in one database transaction which means that the cost per reservation is greatly reduced because the database transaction overheads are a major part of the cost of the writes. The batch of credentials are stored in a local cache.

At step 308, an indication that the batch has been reserved is propagated to the core nodes for storing in the local caches of the core nodes. In this case, the local cache is a replicated copy of the administration data which is used for authentication purposes. It is a different local cache to the local cache described above in which 100 pairs are stored ready to be issued to the helpdesk node. This means we don't have to get all the relevant nodes to agree in a very short time frame that a new credential has been registered, meaning that fewer system resources are required for the same level of service. This is a classic example of the pattern of widening the allowed consistency window in order to improve efficiency/scalability.

Authentication information for credentials in the pool should be changed/recycled after they have been used. It is possible to continue to use the same credentials but this opens up a security problem because an attacker can re-use credentials that haven't expired to act as a valid user of the system without any limit on how long he can use them. An optional enhancement to achieve efficient recycling is described at step S310. The action that reserves a batch of credentials will mark that batch in the core services as eligible for recycling a fixed time, e.g. a configurable number of hours, after they were reserved. If the credentials are used after they have been recycled, the VNC server/viewer will fail to connect to the hosted services and the CSR has to try again with a new session. The number of principals in the batch should be sized to ensure that the time between issue and recycle is significantly longer than any reasonable amount of delay between the session request, and the session starting.

Thus when the admin node determines that a request for a credential has been received (S312), the first step is determine whether or not the fixed time has elapsed (S314). This is because the reserved credentials only have a fixed time in which they can be issued from the admin services' cache before they become stale (i.e. their authentication information is reset in the core services). If the credentials in the admin service cache become stale before they have all been issued, they are discarded (S318) and a fresh batch is be reserved from the core services. Thus, the system loops back to step S306.

If the credentials are still valid, at step S316 credentials are then allocated by the admin service from an in-memory cache, eliminating an additional write cost beyond the batch reservation. The credentials within a reserved batch are issued in a random order to reduce predictability.

The act of reservation triggers the recycling process in the core services that sets new passwords for eligible credentials. Recycling considers those credentials least likely to be allocated soon and least likely to still be in use. If we consider credentials to be arranged around a circle, the reservation of a batch of credentials at one side of the circle will trigger the recycling of credentials on the opposite side of the circle. In practice, each batch of reservations will do slightly more recycling than the batch size to ensure progress is made against any backlog, without doing too much work at once.

FIGS. 4a and 4b show an alternative method for establishing a session between a CSR machine and a subscriber machine. Many of the steps are similar to those in FIGS. 3a and 3b and are thus labelled with the same numbers. Furthermore, the steps described in relation to FIG. 5 may be used in the method of FIGS. 4a and 4b.

FIGS. 4a and 4b provide a system which is easier to use. In such a system, it's important that the CSR be able to communicate credential information with the subscriber easily. The CSR and subscriber may be communicating over the phone, or some other method that doesn't involve computer connectivity, so it is well known to encode data as series of letters and numbers. For ease of use, this sequence of characters should be as short as possible. This sequence of characters is known as the Session ID.

In the method of FIGS. 4a and 4b, the key difference from the previous embodiment is that a session manager is running a service for the CSR to call to obtain a Session ID and CSR credentials ("reserve-session" API). The VNC Server on the Subscriber machine thus calls to look up the Subscriber credentials and CSR ID they must connect with ("map-session" API). The session manager speaks directly with the admin service. The session manager and session ID are only needed if the credential information needs to be communicated out-of-band to the subscriber.

Steps S100 to S108 are the same as FIGS. 3a to 3b. However, the next step differs and instead of the helpdesk node directly requesting the credential pair, at step S200, the helpdesk node connects to the session manager to request a session ID. The session manager starts the session (S202) and contacts the admin node to request a credential pair (S204).

Figure 6:
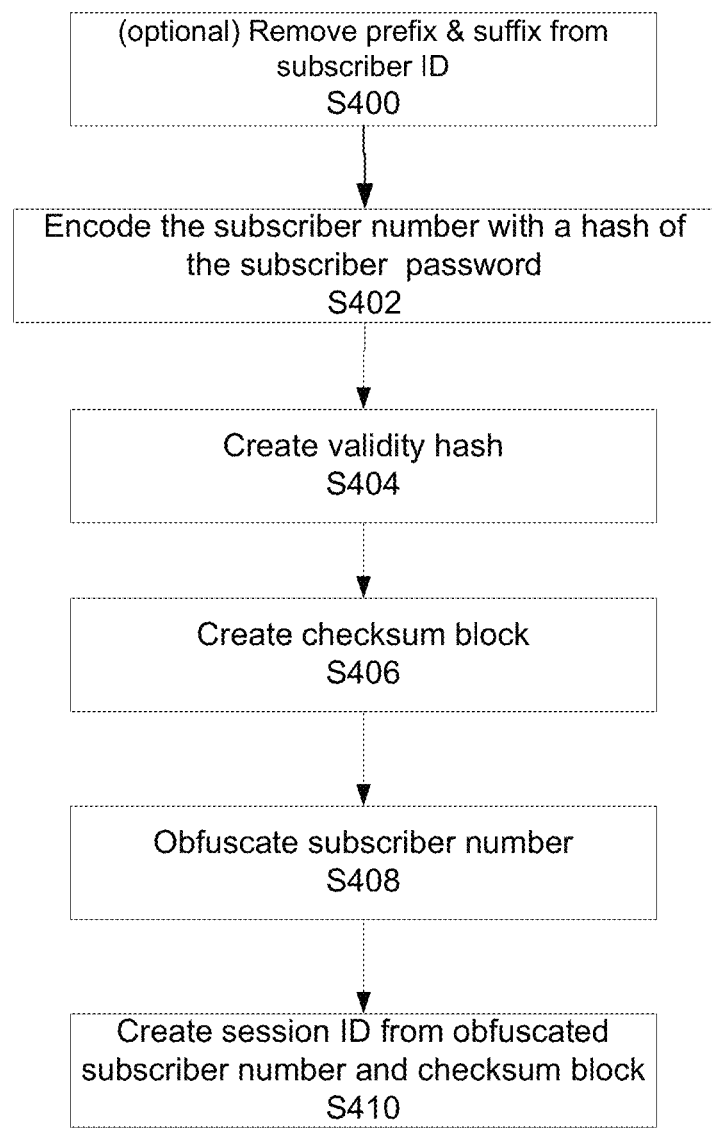
FIG. 6 is a flowchart showing the steps of creating a session ID at the session manager.

As in the previous embodiment, the admin node allocates a credential pair (S112). However, the credential pair is returned to the session manager (not the helpdesk node) (S206). The session manager then forms a session ID and stores the associated credential/ID data (S208). FIG. 6 illustrate the steps in forming a session ID in more detail.

The session ID and credential data are sent from the session manager to the helpdesk node (S210) and from the helpdesk node to the CSR machine. It is noted that in contrast to the previous embodiment, the credential data does not include the full subscriber credentials. The CSR machine sends the session ID to the subscriber (S212) and as previously starts the Viewer application with the CSR credentials (S120) and connects to the core node to wait for a session (S122).

The subscriber machine enters the session ID into the VNC server (S214) which connects the subscriber machine to the session manager to send the session ID to the session manager (S216). The session manager looks up the credential data from the session ID (S218) and returns the subscriber credentials and CSR ID to the subscriber machine (S220). The subscriber machine then starts the server application with the received data (S222). This connects the subscriber machine to the core node for connection to the CSR machine (S126).

The functionality of the core node is unchanged and thus the core services application responds to the requests for connection from the CSR machine and the subscriber machine by authenticating the CSR credentials (S218) received from the CSR machine and by authenticating the subscriber credentials (S130) received from the subscriber machine. If the authentication is correct, the code node establishes a connection from the subscriber machine to the CSR machine (S132). The subscriber machine and the CSR machine can thus start a remote control session (S134) so that the CSR can provide help which is received by the subscriber.

FIG. 6 shows the steps in the creation of a session ID. The session manager service constructs the session ID for the CSR machine to communicate to the subscriber machine. If the optional format described in FIG. 4 is used for pre-pairing the credential data, as an optional step to reduce the amount of data sent in the session ID, and thus the amount of data the user has to type in, in step S400 the common prefix and/or suffix of the subscriber ID are omitted. In this way, only the subscriber number is encoded.

If the subscriber number were sent as the session ID, an attacker would be able to use it to easily predict the next numbers, and spoof subsequent subscriber help sessions. Accordingly, there are several steps which are taken to improve security to make it harder for an attacker to predict the next subscriber number, and for them to create valid session IDs that may allow them to perform a brute-force attack. Many of these steps rely on hashing values using hash keys that are known to both the VNC Server and the session manager service. These keys are baked into both the VNC Server and session manager service at build/configuration time. Given the hash keys can be discovered by a motivated attacker inspecting the VNC Server software, they are not used as part of an encryption process. Instead, they are used to obfuscate or randomize the appearance of the key to reduce key predictability or to make quick checks of session ID validity. It will be appreciated that hashing is just one method of providing the necessary security and other similar security methods may be used. The key function of a hash is that it is not possible to determine the original number from the hashed version, i.e. the function is a one-way function.

At step S402, the session manager encodes the subscriber number and a hash of the subscriber password. We use 'password' here as one type of credential that can be used to authenticate the Subscriber. Other equivalents may occur to someone skilled in the art. This allows the password returned from the map-session call to be verified at the client-side as explained in more detail as follows.

When the Session ID is created, the session manager service knows both the hash key, and the subscriber password, so a hash of the password is created and encoded in the session ID. The Session ID is used by the VNC Server on the Subscriber machine to obtain the subscriber credentials from the session manager service (see step S220). These credentials contain the subscriber password. To make sure we got the right credentials back, the VNC Server hashes the received password, and compares it with the password stored in the session ID. If they do not match, the user has not received the expected subscriber credentials, so should not proceed.

At step S404, a validity hash is created. This may be created by concatenating the subscriber principal number and the password hash and hashing the concatenation with a second hash key. The second hash key may be same as the first hash key but is preferably different. The client can use this validity hash as a check that the subscriber number and password hash have not been tampered with since they were issued, reducing the burden on the session manager of rejecting invalid session IDs, and making it harder for an attacker to generate valid session IDs.

At step S406, a checksum block is created. This may be created by hashing the subscriber number using a third hash key to form a subscriber hash. The third hash key may be same as the first or second hash key but is preferably different. The password hash is concatenated with the validity hash and is XOR'd with the subscriber hash. The XOR cipher is well known in cryptography and is a type of additive cipher. Again a different cipher may also be used. The purpose of this is to increase the amount of entropy in the checksum, making it harder to predict and attack.

The session ID is now comprised of the subscriber number followed by a checksum block of high entropy. The subscriber number is still extremely predictable and visible, making it easy for an attacker predict the next number if they intercepted one. To make this less likely, step S408 obfuscates the subscriber number. For example, this is achieved by using the XOR cipher on the principal ID with a value derived from the checksum block.

The final step S410 is to create the session ID from the obfuscated subscriber number and the checksum block. One method for achieving this is to concatenate the obfuscated subscriber number and the checksum block and to use the XOR cipher on this concatenation and a 'magic number'. This further obfuscates the makeup of the session ID. The magic number is simply another number already known to both VNC Server and session manager service, in the same manner as the hash keys above.

Typically, the session IDs are encoded using a 32 character alphabet which contains upper-case letters and digits, but not the numbers 0 or 1 or the letters I and O due to difficulties in distinguishing between them when reading or sometimes even speaking them (e.g. 'oh' is 0 or O?).

The method described in FIG. 6 allows up to 16 million (2^24) subscriber principals in the pool, large enough to scale to all conceivable deployments. The validation hash for such a scheme is 16 bits long, giving 65k different combinations an attacker would have to try if they were trying to construct their own valid session ID.

However, these lead to a session ID which is 12 characters long whereas customers want a session ID that is 8 characters long because 12 characters are more difficult for a CSR to communicate with a subscriber. To form this short session ID, we reduce the max size of the credential pool to 1 million (2^20) and reduce the size of the validation checksum from 16 bits to 4 bits. This dramatically reduces the protection against attackers creating their own valid session ID, as they only need to try up to 16 different validation checksums. However, it's also worth noting that the attack time is limited to the period between extraction of the pair from the pool, and recycling of the used credentials. New passwords will be chosen during recycling, hence invalidating a session ID. We suggest reducing the recycling time to around an hour when using the short session ID. We consider the risk to be low because a brute force attack is likely to take considerably longer than this.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A system for establishing a helpdesk session between a subscriber device and a customer support representative (CSR) device and enabling remote control of the subscriber device by the CSR device, the system comprising:
  one or more first processors, the one or more first processors being different than a CSR device processor on a CSR device and different than a subscriber processor on a subscriber device;
  a helpdesk node configured to be executed by the one or more first processors to receive a session request for a helpdesk session;
  an admin node configured to be executed by the one or more first processors to issue a credential pair comprising subscriber credentials for the subscriber device and CSR credentials for the CSR device;
  a session manager configured to be executed by the one or more first processors to obtain the credential pair from the admin node and create a session ID for the helpdesk session, the session ID being associated with the credential pair and being different from the subscriber credentials and different from the CSR credentials,
  wherein the session manager is configured to
    send the session ID and the CSR credentials to the helpdesk node, the helpdesk node being configured to provide the session ID and the CSR credentials to the CSR device, the session ID being subsequently provided to a subscriber for input into the subscriber device,
    receive a connection request from the subscriber device, the connection request being generated by the subscriber device in response to the session ID being input into the subscriber device,
    establish a connection with the subscriber device in response to the connection request,
    receive from the subscriber device the session ID via the connection with the subscriber device,
    determine the subscriber credentials from the received session ID, and
    send the subscriber credentials and an identifier of the CSR device to the subscriber device using the connection with the subscriber device; and
  a core node configured to be executed by the one or more first processors to
    receive the CSR credentials from the CSR device,
    authenticate the received CSR credentials,
    receive the subscriber credentials and the identifier of the CSR device from the subscriber device,
    authenticate the received subscriber credentials, and
    if the CSR credentials and the subscriber credentials are authenticated, establish the helpdesk session between the subscriber device and the CSR device identified by the identifier, the helpdesk session enabling the CSR device to remotely control the subscriber device.

2. The system according to claim 1 wherein the helpdesk node is configured to request the credential pair from the admin node and the admin node is configured to return the credential pair to the helpdesk node.

3. The system according to claim 2 wherein the helpdesk node is configured to receive the session request for the helpdesk session from the CSR device and to send the credential pair to the CSR device.

4. The system according to claim 1 wherein the helpdesk node is configured to request the session ID from the session manager.

5. The system according to claim 4 wherein the session manager is configured to request the credential pair from the admin node and the admin node is configured to return the credential pair to the session manager.

6. The system according to claim 1 wherein the session manager is configured to create the session ID using at least part of the subscriber credentials.

7. The system according to claim 6 wherein the subscriber credentials comprise a subscriber identification and a subscriber authentication and wherein the session manager is configured to create the session ID using at least one hash of both the subscriber identification and the subscriber authentication.

8. The system according to claim 6 wherein the session manager is configured to create the session ID by creating a validity hash.

9. The system according to claim 6 wherein the session manager is configured to create the session ID by creating a checksum.

10. The system according to claim 1 wherein the admin node is configured to create a plurality of pre-paired subscriber and CSR credentials before issuing the credential pair, wherein the plurality of pre-paired credentials are created by associating each subscriber device in a plurality of subscriber devices with an associated CSR device and pairing the subscriber credentials and the CSR credentials for each associated pair of devices.

11. The system according to claim 1 wherein the admin node is configured to reserve a batch of credential pairs and store the reserved batch of credential pairs in a local cache.

12. The system according to claim 11 wherein the admin node is configured to send notification that the reserved batch of credential pairs has been reserved to the core node.

13. The system according to claim 11 wherein the admin node is configured to associate the reserved batch of credential pairs with a fixed time period.

14. The system according to claim 13 wherein the admin node is configured to determine if the fixed time period has elapsed and if so, to discard the reserved batch of credential pairs.

15. A method for establishing a helpdesk session between a subscriber device and a customer support representative (CSR) device, the method comprising:
  receiving by a helpdesk node a session request for a helpdesk session;
  issuing by an admin node, after the helpdesk node receives the session request, a credential pair comprising subscriber credentials for a subscriber device and CSR credentials for a CSR device;
  obtaining by a session manager the credential pair from the admin node and creating by the session manager a session ID for the helpdesk session, the session ID being associated with the credential pair and being different from the subscriber credentials and different from the CSR credentials;
  transferring by the session manager the CSR credentials and the session ID to the CSR device;
  sending the transferred session ID from the CSR device to a subscriber for input into the subscriber device;
  receiving a connection request from the subscriber device, the connection request being generated by the subscriber device in response to the session ID being input into the subscriber device;
  establishing a connection with the subscriber device in response to the connection request;
  receiving by the session manager from the subscriber device the session ID via the connection with the subscriber device;
  determining by the session manager the subscriber credentials from the received session ID;
  sending by the session manager the subscriber credentials and an identifier of the CSR device to the subscriber device using the connection with the subscriber device;
  receiving by a core node the CSR credentials from the CSR device;
  authenticating by the core node the received CSR credentials;
  receiving by the core node the subscriber credentials and the identifier of the CSR device from the subscriber device;
  authenticating by the core node the received subscriber credentials; and
  if the CSR credentials and the subscriber credentials are authenticated, establishing by the core node the helpdesk session between the subscriber device and the CSR device identified by the identifier, the helpdesk session enabling the CSR device to remotely control the subscriber device.

16. A non-transitory computer readable medium storing processor control code configured to, when running on a computer, cause the computer to:
  receive by a helpdesk node a session request for a helpdesk session;
  issue by an admin node, after the helpdesk node receives the session request, a credential pair comprising subscriber credentials for a subscriber device and CSR credentials for a CSR device;
  obtain by a session manager the credential pair from the admin node and create by the session manager a session ID for the helpdesk session, the session ID being associated with the credential pair and being different from the subscriber credentials and different from the CSR credentials;
  transfer by the session manager the CSR credentials and the session ID to the CSR device;
  send the transferred session ID from the CSR device to a subscriber for input into the subscriber device;
  receive a connection request from the subscriber device, the connection request being generated by the subscriber device in response to the session ID being input into the subscriber device;
  establish a connection with the subscriber device in response to the connection request;
  receive by the session manager from the subscriber device the session ID via the connection with the subscriber device;
  determine by the session manager the subscriber credentials from the received session ID;
  send by the session manager the subscriber credentials and an identifier of the CSR device to the subscriber device using the connection with the subscriber device;
  receive by a core node the CSR credentials from the CSR device;
  authenticate by the core node the received CSR credentials;
  receive by the core node the subscriber credentials and the identifier of the CSR device from the subscriber device;
  authenticate by the core node the received subscriber credentials; and if the CSR credentials and the subscriber credentials are authenticated, establish by the core node the helpdesk session between the subscriber device and the CSR device identified by the identifier, the helpdesk session enabling the CSR device to remotely control the subscriber device.

\* \* \* \* \*